US008616349B2

United States Patent
Kang

(10) Patent No.: US 8,616,349 B2
(45) Date of Patent: Dec. 31, 2013

(54) DISC BRAKE

(75) Inventor: Jung Sik Kang, Gyeonggi-do (KR)

(73) Assignee: MANDO Corporation, Pyeongtaek-si, Gyeonggi-do (KR)

( * ) Notice: Subject to any disclaimer, the term of this patent is extended or adjusted under 35 U.S.C. 154(b) by 213 days.

(21) Appl. No.: 12/953,623

(22) Filed: Nov. 24, 2010

(65) Prior Publication Data

US 2011/0120818 A1    May 26, 2011

(30) Foreign Application Priority Data

Nov. 25, 2009 (KR) .......................... 10-2009-114304

(51) Int. Cl.
*B60T 11/00* (2006.01)

(52) U.S. Cl.
USPC ......... 188/73.1; 188/71.1; 188/72.4; 188/370

(58) Field of Classification Search
None
See application file for complete search history.

(56) References Cited

U.S. PATENT DOCUMENTS

| | | | | |
|---|---|---|---|---|
| 3,530,493 A | * | 9/1970 | Hollnagel et al. | 188/72.4 |
| 3,887,045 A | * | 6/1975 | DeHoff et al. | 188/73.45 |
| 4,064,974 A | * | 12/1977 | Filderman | 188/71.3 |
| 4,418,796 A | * | 12/1983 | Rittmann | 188/71.5 |
| 5,284,227 A | * | 2/1994 | Pelfrey | 188/71.1 |
| 6,164,421 A | * | 12/2000 | Nakamura et al. | 188/71.5 |
| 6,543,587 B1 | * | 4/2003 | Albrecht | 188/171 |
| 7,837,014 B2 | * | 11/2010 | Schneider | 188/18 A |
| 2002/0092712 A1 | * | 7/2002 | Ishikawa et al. | 188/72.4 |
| 2006/0124404 A1 | * | 6/2006 | Morais et al. | 188/71.1 |
| 2007/0246311 A1 | * | 10/2007 | Schneider | 188/72.7 |
| 2011/0180355 A1 | * | 7/2011 | Pozivilko et al. | 188/72.1 |

FOREIGN PATENT DOCUMENTS

JP    05-22877 U    3/1993
JP    05-099250    4/1993

OTHER PUBLICATIONS

Korean Office Action issued in Korean Patent Application No. KR 10-2009-0114304 dated Feb. 15, 2013.

* cited by examiner

*Primary Examiner* — Thomas Irvin
(74) *Attorney, Agent, or Firm* — McDermott Will & Emery LLP

(57) ABSTRACT

A disc brake to receive a disc and a brake pad. The disc brake includes an inner pad to produce friction with one side of a disc, an outer pad to produce friction with an opposite side of the disc, and a caliper housing including a cylinder part provided therein with a cylinder to receive a piston to press the inner pad and a finger part provided in front of the cylinder part to press the outer pad. The caliper housing includes a spacer to variably change an interval between the cylinder part and the finger part.

9 Claims, 3 Drawing Sheets

DISC BRAKE

CROSS-REFERENCE TO RELATED APPLICATIONS

This application claims the benefit of Korean Patent Application No. 10-2009-0114304, filed on Nov. 25, 2009, in the Korean Intellectual Property Office, the disclosure of which is incorporated herein by reference.

BACKGROUND

1. Field

The disclosure relates to a disc brake, and more particularly to a caliper housing having a width varying according to the thickness of a disc.

2. Description of the Related Art

In general, a disc brake includes a caliper housing to receive a cylinder, a piston, and a brake pad, a disc driven by receiving the rotational force of a driving shaft, a caliper provided outside the brake disc and having a receiving part to receive a part of an outer circumferential surface of the brake disc, brake pads provided on both inner surfaces of the receiving part of the caliper to control the rotation of the brake disc, and the piston operated by a hydraulic pressure pipe line and installed on the brake pads so as to be driven.

According to the disc brake having the above structure, as a brake pedal is pressed, the piston in the cylinder of the caliper moves forward by a hydraulic pressure, so that the piston presses a pair of pads provided at both sides of the disc toward the disc, thereby braking wheels based on friction produced between contact surfaces of the pads and the disc.

Such a caliper housing includes a cylinder part for installing a piston used to press a pad plate and a finger part used to press an outer pad plate. The caliper housing including the cylinder part and the finger part is integrally molded. The finger part branches to both directions and a predetermined cavity is formed at a center thereof in such a manner that the cylinder for receiving the piston can be formed in the cylinder part.

SUMMARY

Accordingly, it is an aspect of the disclosure to provide a disc brake.

Since the caliper housing of the disc brake according to the related art is integrally formed through the molding process, there is limitations to manufacturing the caliper housing having a complex structure. In addition, the size of the finger part in which a disc and the brake pad are received is restricted. Thus, the specification of the caliper housing must be changed according to the variation in the thickness of the disc, so that the manufacturing cost may be increased.

Additional aspects and/or advantages of the disclosure will be set forth in part in the description which follows and, in part, will be apparent from the description, or may be learned by practice of the disclosure.

The foregoing and/or other aspects of the disclosure are achieved by providing a disc brake.

The disc brake includes an inner pad to produce friction with one side of a disc, an outer pad to produce friction with an opposite side of the disc, and a caliper housing including a cylinder part provided therein with a cylinder to receive a piston to press the inner pad and a finger part provided in front of the cylinder part to press the outer pad. The caliper housing includes a spacer to variably change an interval between the cylinder part and the finger part.

The cylinder part, the finger part, and the spacer are coupled with each other by using a coupling member.

The spacer is provided at one side thereof with a piston guide to guide the piston.

Another aspect of the disclosure, there is provided a caliper housing including a cylinder part provided therein with a cylinder used to receive a piston, a finger part provided in front of the cylinder part, and a spacer to variably change an interval between the cylinder part and the finger part.

As described above, according to the disc brake of the disclosure having the above structure, the caliper housing is divided into a cylinder part and a finger part, so that the caliper housing can be easily molded with various shapes.

Even if the disc thickness is changed, a novel caliper housing is not necessary because the interval between the cylinder part and the finger part of the caliper housing can be adjusted by a spacer, so the caliper housing according to the present invention is applicable for discs having various specifications.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
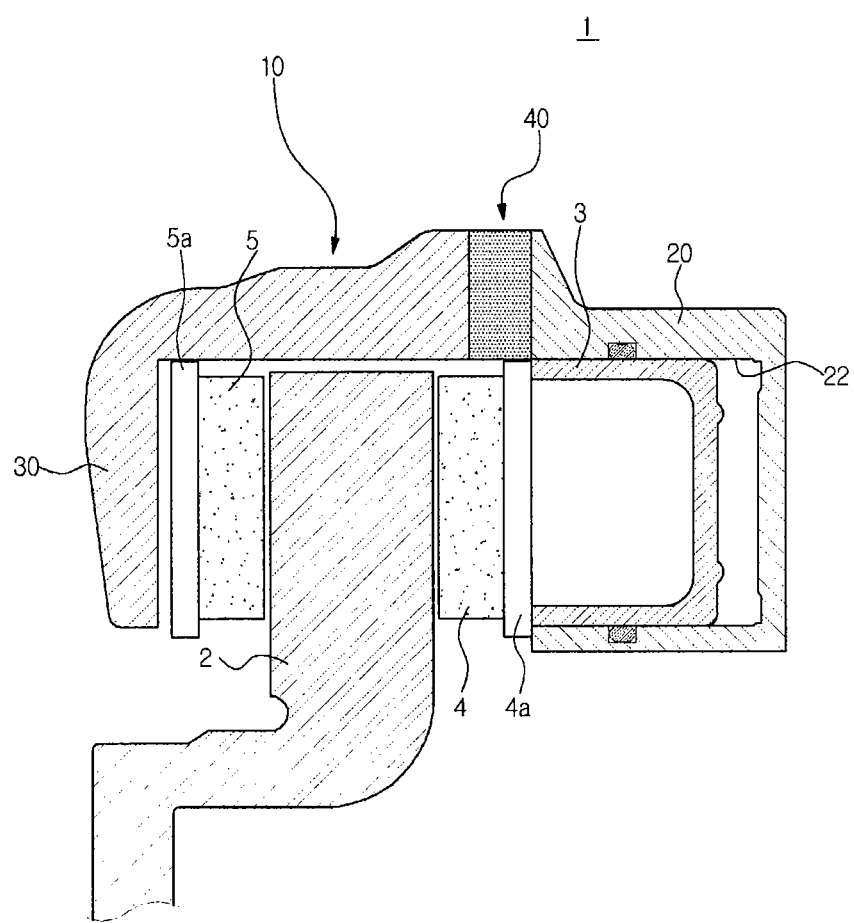
FIG. 1 is a sectional view schematically showing a disc brake according to an embodiment of the disclosure.

Reference will now be made in detail to the embodiments, examples of which are illustrated in the accompanying drawings, wherein like reference numerals refer to the like elements throughout. The embodiments are described below to explain the disclosure by referring to the figures.

As shown in accompanying drawings, a disc brake 1 according to an embodiment of the disclosure includes a carrier (not shown), inner and outer pads 4 and 5 installed inside the carrier in such a manner that the inner pad 4 is spaced apart from the outer pad 5 at a predetermined distance, and a caliper housing 10 reciprocating with respect to the carrier.

The carrier is fixedly installed in a vehicle body (not shown) and provided at the central portion of an inner installation space thereof with inner and outer pad plates 4a and 5a having inner and outer pads 4 and 5 attached thereto, respectively, in a longitudinal direction.

The inner pad plate 4a is provided on one surface thereof with an inner pad 4 and makes contact with the piston 3. The outer pad plate 5a is spaced apart from the inner pad plate 4a at a predetermined distance, provided on one surface thereof with an outer pad 5 attached thereto, and installed at an outer portion of the disc brake 1.

The caliper housing 10 includes a cylinder part 20 to press the inner pad 4 and a finger part 30 to surround the outer pad 5 and press the outer pad 5 to a disc 2.

The cylinder part 20 includes a cylinder 22 such that a piston 3 is installed in the cylinder 22 to press the inner pad 4 by the hydraulic pressure delivered through an inlet port (not shown), and the piston 3 reciprocates in the cylinder 22.

The cylinder part 20 includes aluminum or the alloy thereof, and may be manufactured as a mold through a molding process.

The finger part 30 branches into two parts, and the two branch parts are combined with each other at a lower end portion of the finger part 30. A space part 32 is formed at the central portion of the finger part 30 by the two branch parts. The combination of the two branch parts is necessary to improve the vibration characteristic of the finger part 30 in the braking operation.

Preferably, the finger part 30 includes cast iron or spheroidal graphite cast iron.

In addition, the caliper housing 10 includes a spacer 40 interposed between the cylinder part 20 and the finger part 30.

The spacer 40 preferably includes cast iron, spheroidal graphite cast iron, aluminum, or the alloy thereof, and may be manufactured as a mold through a molding process.

The spacer 40 is interposed between the cylinder part 20 and the finger 30 to change the width of the caliper housing 10. Particularly, the spacer 40 changes the width of the caliper housing 10 according to the variation in the thickness of the disc 2.

Figure 2:
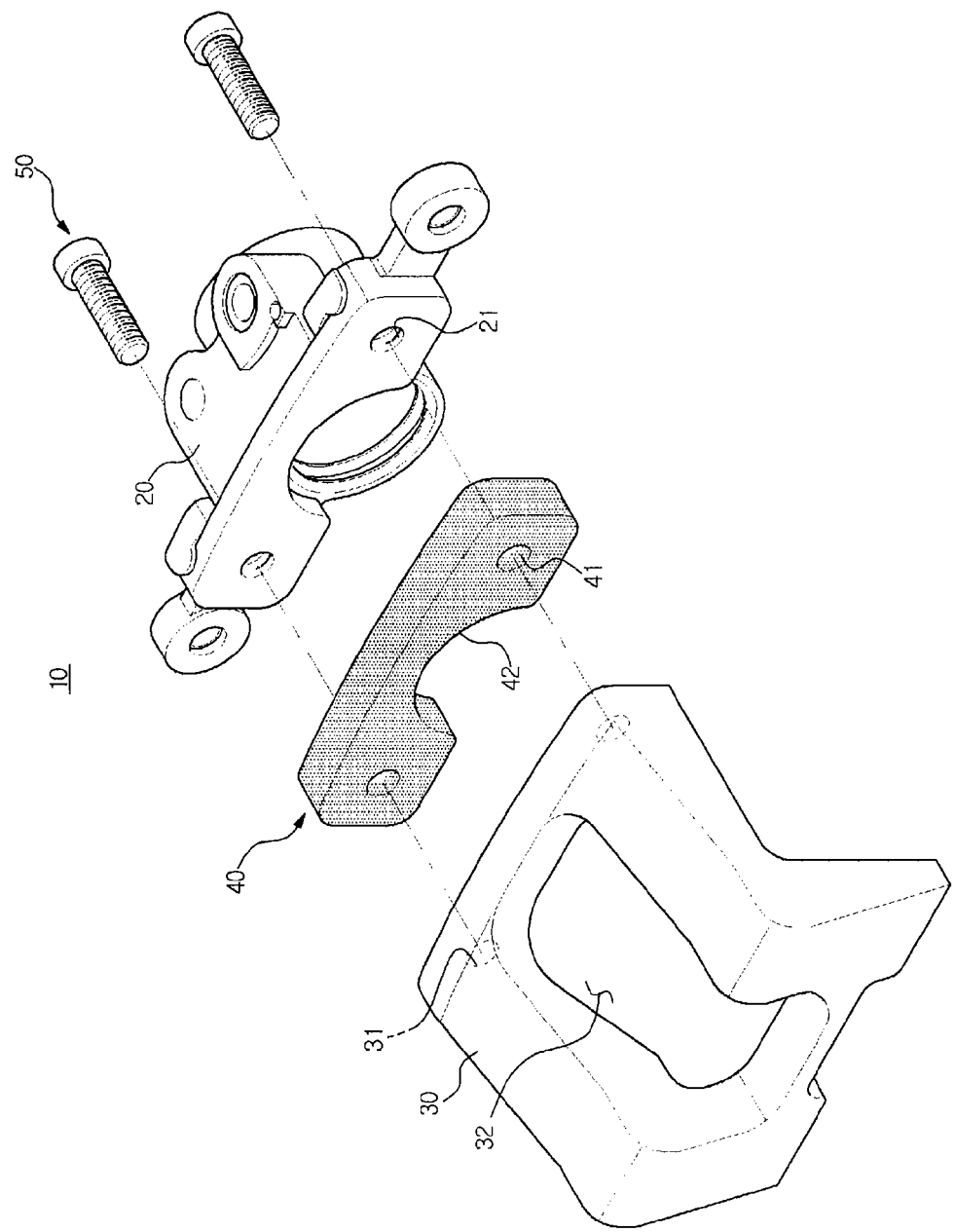
FIG. 2 is an exploded perspective view schematically showing a caliper housing of the disc brake according to the embodiment of the disclosure.
Figure 3:
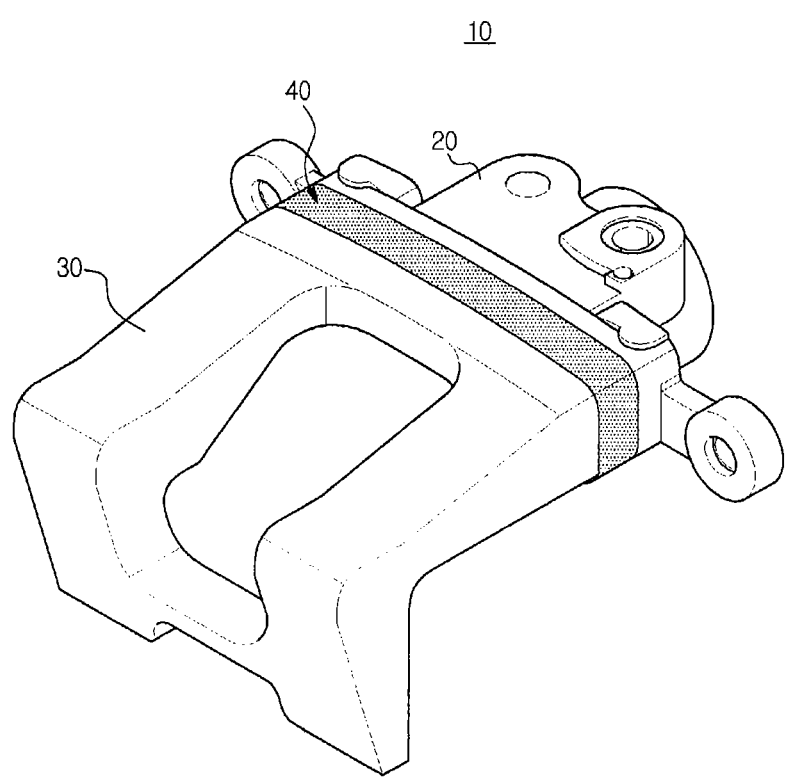
FIG. 3 is a perspective view schematically showing the caliper housing of the disc brake according to the embodiment of the disclosure.

As shown in FIGS. 2 and 3, the cylinder part 20 and the finger part 30 of the caliper housing 10 are coupled with each other by using coupling members 50 after the cylinder part 20 and the finger part 30 of the caliper housing 10 have been separately formed.

The cylinder part 20 is provided at both end parts thereof with through holes 21, and the finger part 30 is provided therein with grooves 31 with a predetermined depth corresponding to the through holes 31.

In addition, the spacer 40 interposed between the cylinder part 20 and the finger part 30 is provided at both end parts thereof with assembling holes 41.

Therefore, after preparing the spacer 40 between the cylinder part 20 and the finger part 30, the through holes 21, the assembling holes 41, and the grooves 31 are provided in line with each other and assembled by using the coupling members 50.

In this case, the coupling member 50 preferably includes a bolt.

The spacer 40 has a plate shape to make contact with surfaces of the cylinder part 20 and the finger part 30. In addition, the spacer 40 is provided therein with a piston guide 42 having a hemispherical shape to guide the piston 3 when the piston 3 reciprocates.

Hereinafter, the operation of the disc brake 1 having the above structure will be described.

If a driver presses a brake pedal (not shown) to brake a vehicle, the hydraulic pressure is delivered to the cylinder 22 of the cylinder part 22 from the master cylinder (not shown) through the inlet port, so that the piston 3 is forwarded.

In this case, the inner and outer plates 4a and 5a installed in a carrier (not shown) move inward, and the inner and outer pads 4 and 5 are attached to both side surfaces of the disc 2, which is rotating, to produce friction, so that the braking operation can be performed.

Although few embodiments have been shown and described, it would be appreciated by those skilled in the art that changes may be made in these embodiments without departing from the principles and sprit of the disclosure, the scope of which is defined in the claims and their equivalents.

What is claimed is:

1. A disc brake comprising:
an inner pad to produce friction with one side of a disc;
an outer pad to produce friction with an opposite side of the disc; and
a caliper housing including a cylinder part provided therein with a cylinder to receive a piston to press the inner pad and a finger part provided in front of the cylinder part to press the outer pad,
wherein the caliper housing includes a spacer to variably change an interval between the cylinder part and the finger part,
wherein the spacer is provided at one side thereof with a piston guide which faces the piston so as to guide the piston,
wherein the piston guide has a shape corresponding to the piston, and
wherein the shape is hemispherical.

2. The disc brake of claim 1, wherein the cylinder part, the finger part, and the spacer are coupled with each other by using a coupling member.

3. The disc brake of claim 1, wherein the spacer includes at least one selected from the group consisting of cast iron, spheroidal graphite cast iron, and aluminum or an alloy thereof.

4. The disc brake of claim 1, wherein the piston guide is arranged to be in sliding contact with the piston.

5. The disc brake of claim 1, wherein the finger part branches into two parts, and the two branch parts are combined with each other at a lower end portion of the finger part, and
a space part is formed at a central portion of the finger part by the two branch parts.

6. A caliper housing comprising:
a cylinder part provided therein with a cylinder used to receive a piston;
a finger part provided in front of the cylinder part; and
a spacer to variably change an interval between the cylinder part and the finger part,
wherein the spacer is provided at one side thereof with a piston guide which faces the piston so as to guide the piston,
wherein the piston guide has a shape corresponding to the piston, and
wherein the shape is hemispherical.

7. The caliper housing of claim 6, wherein the spacer includes at least one selected from the group consisting of cast iron, spheroidal graphite cast iron, and aluminum or an alloy thereof.

8. The caliper housing of claim 6, wherein the piston guide is arranged to be in sliding contact with the piston.

9. The caliper housing of claim 6, wherein the finger part branches into two parts, and the two branch parts are combined with each other at a lower end portion of the finger part, and
a space part is formed at a central portion of the finger part by the two branch parts.

* * * * *